United States Patent
Shi

(10) Patent No.: US 10,802,441 B2
(45) Date of Patent: Oct. 13, 2020

(54) OPTICAL MODULATION METHOD, OPTICAL MODULATION DEVICE AND HOLOGRAPHIC DISPLAY APPARATUS

(71) Applicant: BOE TECHNOLOGY GROUP CO., LTD., Beijing (CN)

(72) Inventor: Bingchuan Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 276 days.

(21) Appl. No.: 15/920,771

(22) Filed: Mar. 14, 2018

(65) Prior Publication Data

US 2019/0064737 A1  Feb. 28, 2019

(30) Foreign Application Priority Data

Aug. 30, 2017 (CN) .......................... 2017 1 0763122

(51) Int. Cl.
*G03H 1/14* (2006.01)
*G03H 1/12* (2006.01)
(Continued)

(52) U.S. Cl.
CPC .............. *G03H 1/14* (2013.01); *G03H 1/0443* (2013.01); *G03H 1/12* (2013.01); *G03H 1/2286* (2013.01); *G03H 1/2294* (2013.01); *G03H 2001/0224* (2013.01); *G03H 2001/2292* (2013.01); *G03H 2210/11* (2013.01); *G03H 2210/12* (2013.01); *G03H 2210/44* (2013.01); *G03H 2223/24* (2013.01); *G03H 2225/31* (2013.01);
(Continued)

(58) Field of Classification Search
None
See application file for complete search history.

(56) References Cited

U.S. PATENT DOCUMENTS 3,674,332 A * 7/1972 Kogelnik ............. G03H 1/0248
359/3
5,416,618 A * 5/1995 Juday ....................... G02F 3/00
349/1
(Continued)

FOREIGN PATENT DOCUMENTS

CN    103792826 A    5/2014
CN    105824128 A    8/2016
(Continued)

OTHER PUBLICATIONS

First Office Action for CN Appl. No. 201710763122.X, dated Sep. 24, 2019.

*Primary Examiner* — Derek S. Chapel
(74) *Attorney, Agent, or Firm* — Dinsmore & Shohl LLP

(57) ABSTRACT

The present disclosure provides an optical modulation device, an optical modulation method and a holographic display apparatus. The optical modulation device is configured to perform optical modulation of a light beam and comprising: an amplitude modulator, configured to perform amplitude modulation of the light beam based on amplitude information in complex amplitude information of each pixel of a digital hologram; an optical scanning assembly, configured to scan the light beam within a predetermined range; a phase modulator, configured to perform phase modulation of the light beam based on phase information in the complex amplitude information.

12 Claims, 3 Drawing Sheets

(51) Int. Cl.
    *G03H 1/04*     (2006.01)
    *G03H 1/22*     (2006.01)
    *G03H 1/02*     (2006.01)

(52) U.S. Cl.
    CPC ..... *G03H 2225/32* (2013.01); *G03H 2225/33* (2013.01); *G03H 2225/34* (2013.01)

(56) References Cited

U.S. PATENT DOCUMENTS

| | | | |
|---|---|---|---|
| 8,593,710 B2* | 11/2013 | Renaud-Goud | G03H 1/2294 359/11 |
| 2007/0019268 A1 | 1/2007 | Kihara | |
| 2008/0080030 A1 | 4/2008 | Fukumoto et al. | |
| 2016/0379606 A1* | 12/2016 | Kollin | G02B 27/0093 345/428 |

FOREIGN PATENT DOCUMENTS

| | | |
|---|---|---|
| CN | 106154799 A | 11/2016 |
| CN | 106773589 A | 5/2017 |

\* cited by examiner

OPTICAL MODULATION METHOD, OPTICAL MODULATION DEVICE AND HOLOGRAPHIC DISPLAY APPARATUS

CROSS-REFERENCE TO RELATED APPLICATIONS

The present application claims the priority from Chinese Patent Application No. 201710763122.X filed on Aug. 30, 2017, the contents of which are hereby incorporated by reference in their entirety for all purposes.

TECHNICAL FIELD

The present disclosure relates to an optical modulation method, an optical modulation device and a holographic display apparatus.

BACKGROUND

In holographic display technology, electrically controlled modulators are required to have amplitude and phase modulation capabilities. Most of the related electrically controlled modulator are spatial light modulators of a two-dimensional matrix type based on liquid crystal technology, which only have a phase modulation capability or only have an amplitude modulation capability. Among them, the holographic display technology based on an amplitude type modulator needs to adopt the encoding technology to embed the phase, while the holographic display technology based on the phase type modulator needs to adopt an iterative algorithm to realize the modulation of an amplitude by a phase type hologram. Currently, based on the consideration of optical efficiency, a phase type modulator is often used in the holographic display technology.

SUMMARY

The embodiments of the present disclosure propose an optical modulation device, which is configured to perform optical modulation of a light beam and comprising: an amplitude modulator, configured to perform amplitude modulation of the light beam based on amplitude information in complex amplitude information of each pixel of a digital hologram; an optical scanning assembly, configured to scan the light beam within a predetermined range; a phase modulator, configured to perform phase modulation of the light beam based on phase information in the complex amplitude information.

The holographic display apparatus proposed in the embodiments of the present disclosure comprising: the aforementioned optical modulation device; and a controller, configured to receive a digital hologram to be displayed and decompose complex amplitude information of each pixel of the digital hologram into the amplitude information and the phase information to generate an amplitude modulation control signal and a phase modulation control signal, and respectively send the amplitude modulation control signal and the phase modulation control signal to the amplitude modulator and the phase modulator.

The embodiments of the present disclosure propose an optical modulation method, which is used for performing optical modulation of a light beam and comprising: decomposing complex amplitude information of each pixel of a digital hologram into amplitude information and phase information; performing amplitude modulation of the light beam based on the amplitude information; scanning the light beam within a predetermined range; performing phase modulation of the light beam based on the phase information.

DETAILED DESCRIPTION

Various embodiments of the present disclosure will be described in detail below with reference to the accompanying drawings.

Figure 1:
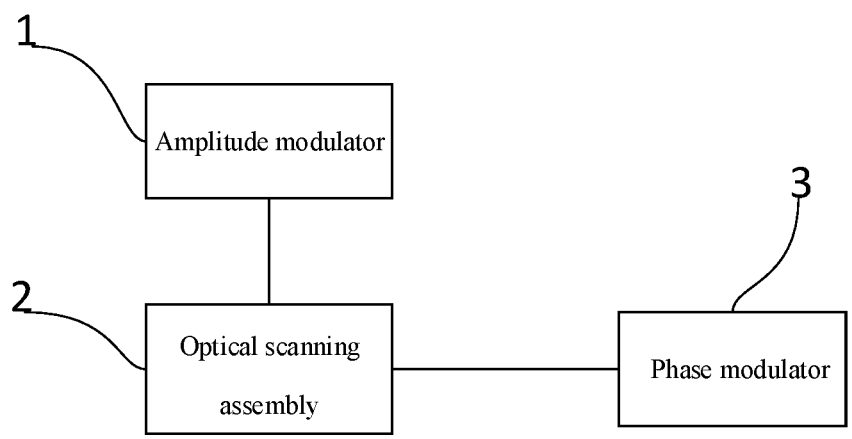
FIG. 1 is a schematic block diagram of one or more embodiments of the optical modulation device of the present disclosure.

FIG. 1 is a schematic block diagram of one or more embodiments of the optical modulation device of the present disclosure.

The optical modulation device according to an embodiment of the present disclosure is used for performing optical modulation of a light beam. As shown in FIG. 1, the optical modulation device of the present embodiment includes an amplitude modulator 1, an optical scanning assembly 2 and a phase modulator 3.

The amplitude modulator 1 is used for performing amplitude modulation of the light beam according to amplitude information in complex amplitude information of each pixel of a digital hologram. The digital image data may be represented in the form of a matrix, wherein the data of each position represents the amplitude information of a corresponding pixel. The digital hologram may also be represented in the form of a matrix, which differs from normal digital image data in that the data at respective positions in the holographic image data matrix of the digital hologram represents the amplitude information and phase information of a corresponding pixel, usually referring to as complex amplitude information. In an embodiment of the present disclosure, for the digital hologram to be displayed, the complex amplitude information of each pixel position in the holographic image data matrix is decomposed into amplitude information and phase information, and a modulation control signal based on the amplitude information is sequentially input to the amplitude modulator 1. The amplitude modulator 1 generates the first modulation light beam having the amplitude information in real time on the basis of the amplitude control signals corresponding to the respective pixels sequentially received, and outputs the first modulation light beam to the optical scanning assembly 2.

After the optical scanning assembly 2 receives the first modulation light beam from the amplitude modulator 1, the first modulated light beam deflects at different angles so that the first modulation light beam is scanned within a predetermined range. As the angle at which the optical scanning assembly 2 deflects the first modulation light beam corresponds to the position of the pixel whose amplitude information is represented by the first modulation light beam in the holographic image data matrix, a predetermined range within which the first modulation light beam is scanned is the same as a display range of the holographic image to be displayed.

In some embodiments of the present disclosure, the optical scanning assembly 2 causes the first modulation light beam to be scanned in parallel light beams within the predetermined range. That is, the corresponding first modulation light beams of the respective pixels are parallel to each other. By making the corresponding first modulation light beams of the respective pixels parallel to each other, for example, it is possible to reduce the number of optical elements in the device, reduce the requirements for the positioning accuracy of the optics in the device, and the like.

In some further embodiments of the present disclosure, the optical scanning assembly 2 causes the first modulation light beam to be scanned in non-parallel light beams within a predetermined range. That is, the corresponding first modulation light beams of the respective pixels converge to or diverge from each other. After that, other optical elements may be used as needed to adjust the corresponding light beams of the respective pixels to be parallel to each other. By allowing the corresponding first modulation light beams of the respective pixels to converge to each other, for example, smaller-sized optical elements and phase modulators may be used, thereby reducing the size of the device. In addition, by diverging the corresponding first modulation light beams of the respective pixels from each other, for example, optical elements of the same size may be used to produce larger-sized holograms and/or, for example, larger-sized phase modulators may be used to reduce the cost of the phase modulator, increase the accuracy of the phase modulation accuracy, and the like.

The phase modulator 3 receives the first modulation light beam from the optical scanning unit 2, and receives a phase control signal generated based on the phase information in the complex amplitude information of the corresponding pixel. According to the phase control signal, the phase modulator 3 performs phase modulation of the received first modulation light beam in real time to generate and output a second modulation light beam, so as to perform holographic image display.

In an embodiment of the present disclosure, the first modulation light beam is generated based on the amplitude information in the complex amplitude information of each pixel, such that the first modulation light beam is scanned in space according to the position of each pixel in the data matrix, and phase modulation of the scanning first modulation light beam is performed based on the phase information in the complex amplitude information of the corresponding pixel, and the second modulation light beam is generated. In an embodiment of the present disclosure, amplitude modulation and phase modulation are sequentially performed over the light beam, so that there is basically no loss in the resolution of the modulator, and high-resolution holographic display can be realized. It is necessary to explain that, with an extremely fast transmission speed of light, the amplitude modulation and phase modulation of the light beam may be considered to be substantially accomplished at the same time. In addition, since the phase information does not need to be embedded, the optical modulation manner in an embodiment of the present disclosure is not present with the problems in the aspects of diffraction efficiency and stray light. Moreover, the calculation processing in the optical modulation manner of an embodiment of the present disclosure mainly decomposes the complex amplitude information of each pixel of the digital hologram into the amplitude information and phase information, and generates the corresponding amplitude control signal and phase control signal. Therefore, the entire modulation process requires only a small amount of computing resources, greatly reducing the difficulty of real-time processing by the computer.

Figure 2:
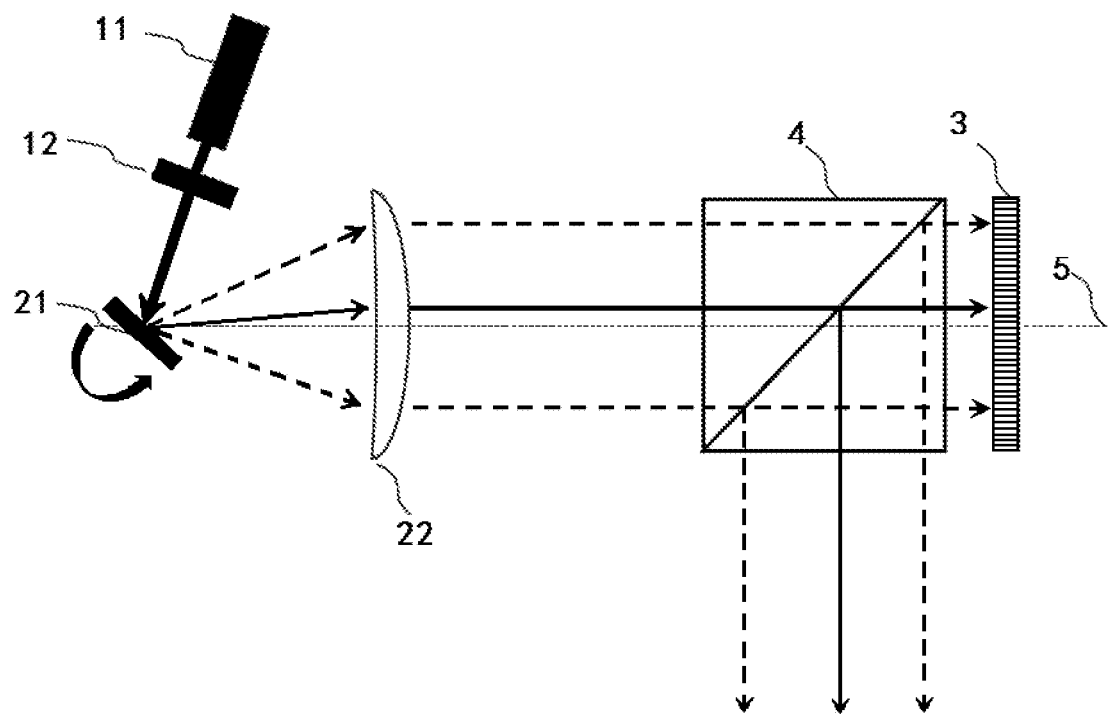
FIG. 2 is a schematic structural view of one or more embodiments of the optical modulation device of the present disclosure.

FIG. 2 is a schematic structural view of one or more embodiments of the optical modulation device of the present disclosure.

As shown in FIG. 2, the amplitude modulator 1 in the present embodiment may include an intensity modulator 12. The light source 11 generates a first light beam, and the intensity modulator 12 receives the first light beam from the light source 11 and sequentially receives amplitude control signals generated by the amplitude information decomposed from the complex amplitude information of each pixel position in the holographic image data matrix. The intensity modulator 12 performs amplitude modulation of the first light beam in real time based on the received amplitude information, thereby generating a first modulation light beam having amplitude information.

In some embodiments of the present disclosure, the light source 11 shown in FIG. 2 may be outside the optical modulation device for generating a light beam input to the optical modulation device. In some embodiments of the present disclosure, the light source 11 may serve as a part of the optical modulation device according to the present embodiment. In this case, in addition to employing a discrete structure including the light source 11 and the intensity modulator 12 similar to that shown in FIG. 2, in at least some embodiments of the present disclosure, the light source 11 and the intensity modulator 12 may be combined with each other, i.e., the intensity modulation function is integrated into the light source to achieve an integrated optical modulator. For example, in some embodiments of the present disclosure, the output power of laser may be modulated directly by controlling the pumping power of the laser and the like.

Since the amplitude modulator in the embodiments of the present disclosure only needs to generate the light beam containing the amplitude information, various amplitude modulators in common digital image display technologies may be employed. In the embodiments of the present disclosure, since the amplitude modulator is only responsible for modulating the amplitude, there is no need to embed the phase information, thus ensuring the high resolution of the amplitude modulator.

With reference to FIG. 2, the optical scanning assembly 2 of an embodiment of the present disclosure may include a micromirror 21 and a lens assembly 22. The micromirror 21 receives the deflection control signal, rotates by a corresponding deflection angle under the control of the deflection control signal, and reflects and receives the first modulation light beam from the amplitude modulator 1 based on the deflection angle. The deflection control signal may be generated based on the position of each pixel of the digital hologram in the digital hologram. The lens assembly 22 outputs the first modulation light beam from the micromirror 21 along a direction parallel to the optical axis 5 of the lens assembly 22, so as to input the first modulation light beam into the phase modulator 3 in a line-by-line scanning manner. In at least some embodiments of the present disclosure, besides the line-by-line scanning method, for example, an interlaced scanning manner or other scanning manners may be employed.

In at least some embodiments of the present disclosure, the first modulation light beam from the amplitude modulator 1 is incident on at a center of a deflection axis of the micromirror 21, and a focal point of the lens assembly 22 is also positioned at the center of a deflection axis of the micromirror 21, so that the light beam output through the lens assembly 22 can be parallel to the optical axis 5 regardless of how the micromirror 21 deflects. The center of a deflection axis of the micromirror 21 refers to a position of the micromirror 21 which maintains at a substantially constant position during the deflection process.

Figure 3:
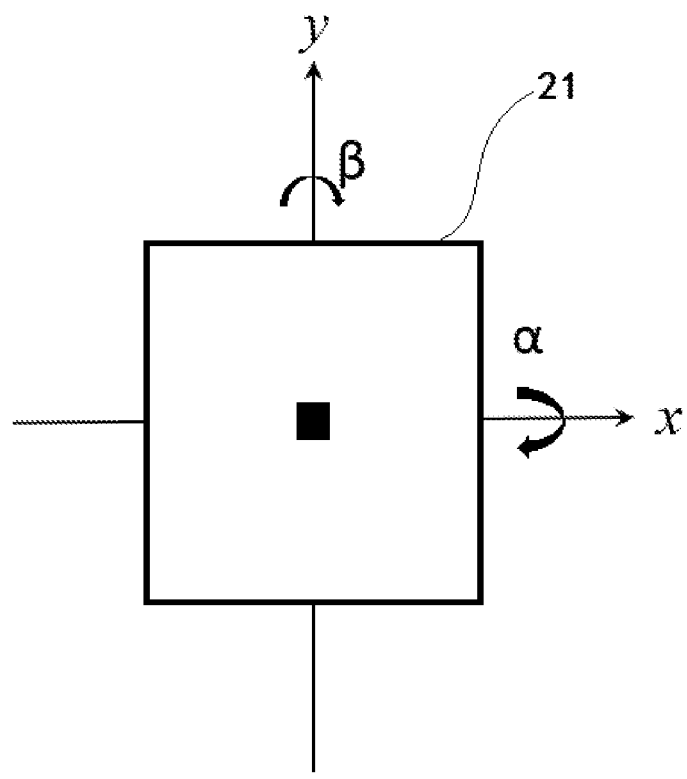
FIG. 3 is a schematic view of a micromirror in an optical scanning assembly in one or more embodiments of the optical modulation device of the present disclosure.

In some embodiments of the present disclosure, the micromirror 21 may be implemented using a MEMS (Micro-Electro-Mechanical System) mirror, as shown in FIG. 3. The MEMS mirror 21 is a reflection type optic whose optical working surface is a micro movable mirror that may be controlled to rotate around an x-axis and a y-axis within certain angle range, so that the reflection light beam is scanned in space. As shown in FIG. 3, the angle at which the MEMS mirror 21 rotates around the x-axis is $\alpha$, the angle of rotation around the y-axis is $\beta$, and the intersection point of the x-axis and the y-axis is a center of a deflection axis of the MEMS mirror 21.

In some further embodiments of the present disclosure, the optical scanning assembly may also be other optical elements, such as a refractive optical scanning assembly, a diffractive optical scanning assembly, an optical phased array, and the like.

In some embodiments of the present disclosure, the phase modulator 3 may be implemented using an LCoS (Liquid Crystal on Silicon) device. The LCoS device is a reflection type optical modulator with a two-dimensional arrangement of pixel structures, which may provide phase modulation of the light beam in a two-dimensional direction. In some further embodiments of the present disclosure, the phase modulator 3 may also use an LCD device, and the LCD device may implement transmission type phase modulation.

In some embodiments of the present disclosure, the optical modulation device may also comprise a light splitter 4 as shown in FIG. 2, which is arranged on an output light path of the optical scanning assembly 2 and positioned to reflect the second modulation light beam from the phase modulator 3. In the modulation process, parallel light beams output from the lens assembly 22 are input to the light splitter 4, so that a portion of the light beam input to the light splitter 4 is reflected by the light splitter 4 in a direction perpendicular to the optical axis 5 (not shown), and the other portion is input to the phase modulator 3 after transmission through the light splitter 4. In some embodiments, as the optical modulation device is arranged in the orientation shown in FIG. 2, the first modulation light beam transmitted through the light splitter 4 is reflected and output to enter the light splitter 4 after modulation by the phase modulator 3, and reflected and output by the light splitter 4.

In some further embodiments of the present disclosure, instead of the light splitter 4, a reflector (not shown) may be provided in the optical modulation device. The optical reflection surface of the reflector may be arranged towards the optical scanning assembly 2 and at a predetermined inclination angle with a direction of the first modulation light beam output by the optical scanning assembly 2. In some embodiments, the predetermined inclination angle of the optical reflection surface of the reflector with the first modulation light beam is, for example, between 30 degrees and 60 degrees, so as to facilitate input of the first modulation light beam to the next optical member separated from the optical scanning assembly 2. The reflector in the present embodiment is used for reflecting the first modulation light beam output by the optical scanning assembly 2 to the phase modulator 3 arranged at a predetermined orientation. In the present embodiment, the reflector is used to change a light path of the first modulation light beam output by the optical scanning assembly 2, so that the loss of the first modulation light beam can be reduced compared with the case of using the light splitter.

In some embodiments of the present disclosure, the phase modulator 3 may be arranged at a predetermined angle with the input first modulation light beam when a reflection type phase modulator is used. In some embodiments, the predetermined angle of the reflection type phase modulator with the first modulation light beam is for example between 80 degrees and 90 degrees, such as 90 degrees, 85 degrees, 84 degrees, etc., such that the phase modulator has a greater area in a direction perpendicular to the light beam, so as to facilitate improving the resolution of phase modulation.

In the above embodiments of the present disclosure, the light beam sequentially passes through the amplitude modulator, the optical scanning assembly and the phase modulator in order. However, in one or more embodiments of the present disclosure, the front-and-back positions of the amplitude modulator, the phase modulator and the optical scanning assembly in the light path may be changed. For example, the first modulation light beam may be generated firstly by the phase modulator based on the phase information in the complex amplitude information of each pixel of the digital hologram. Afterwards, the first modulation light beam from the phase modulator is received by the optical scanning assembly, and the first modulation light beam is scanned within a predetermined range. Finally, the first modulation light beam from the optical scanning assembly is received by the amplitude modulator, and amplitude modulation is performed over the received first modulation light beam based on the amplitude information in the complex amplitude information so as to generate the second modulation light beam. That is, the light beam sequentially passes through the phase modulator, the optical scanning assembly and the amplitude modulator. In the embodiment, the light source may be included in the phase modulator.

Similarly, the light beam may be first scanned by the optical scanning assembly within a predetermined range, and then sequentially pass through the amplitude modulator and the phase modulator, or then sequentially pass through the phase modulator and the amplitude modulator. A person skilled in the art may understand that, all the arrangement sequences of the amplitude modulator, the phase modulator and the optical scanning assembly are included within the scope of the embodiments of the present disclosure.

Figure 4:
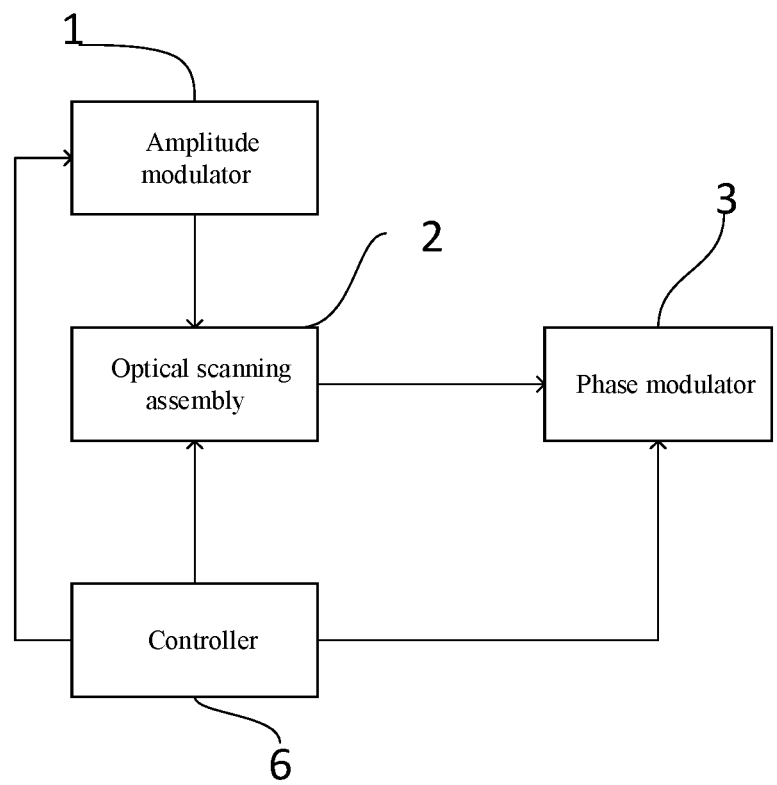
FIG. 4 is a schematic block diagram of one or more embodiments of the holographic display apparatus of the present disclosure.

FIG. 4 is a schematic block diagram of one or more embodiments of the holographic display apparatus of the present disclosure.

As shown in FIG. 4, the holographic display apparatus of the embodiments of the present disclosure further comprises a controller 6 in addition to the amplitude modulator 1, the optical scanning assembly 2 and the phase modulator 3 as shown in FIG. 1. The controller 6 is used for receiving a digital hologram to be displayed, and decomposing complex amplitude information of each pixel of the digital hologram into the amplitude information and the phase information. Afterwards, the controller 6 respectively generates an amplitude control signal and a phase control signal according to the amplitude information and the phase information, and respectively sends the amplitude control signal and the phase control signal in synchronization to the amplitude modulator 1 and the phase modulator 3. The controller 6 also generates a scanning bearing control signal at the same time according to the position of each pixel in the holographic image data matrix, and sends the scanning orientation control signal to the optical scanning assembly 2 to control its scanning orientation. In the aforementioned embodiment where the optical scanning assembly includes a micromirror, the scanning orientation control signal is a deflection control signal of the micromirror.

In the present embodiment, the controller 6 is a single controller that realizes the aforementioned calculation and control processing, but in at least some embodiments of the present disclosure, the controller 6 includes a main controller that performs a decomposing processing of the complex amplitude information, and a sub-controller connected to the main controller and respectively generating each control signal.

Figure 5:
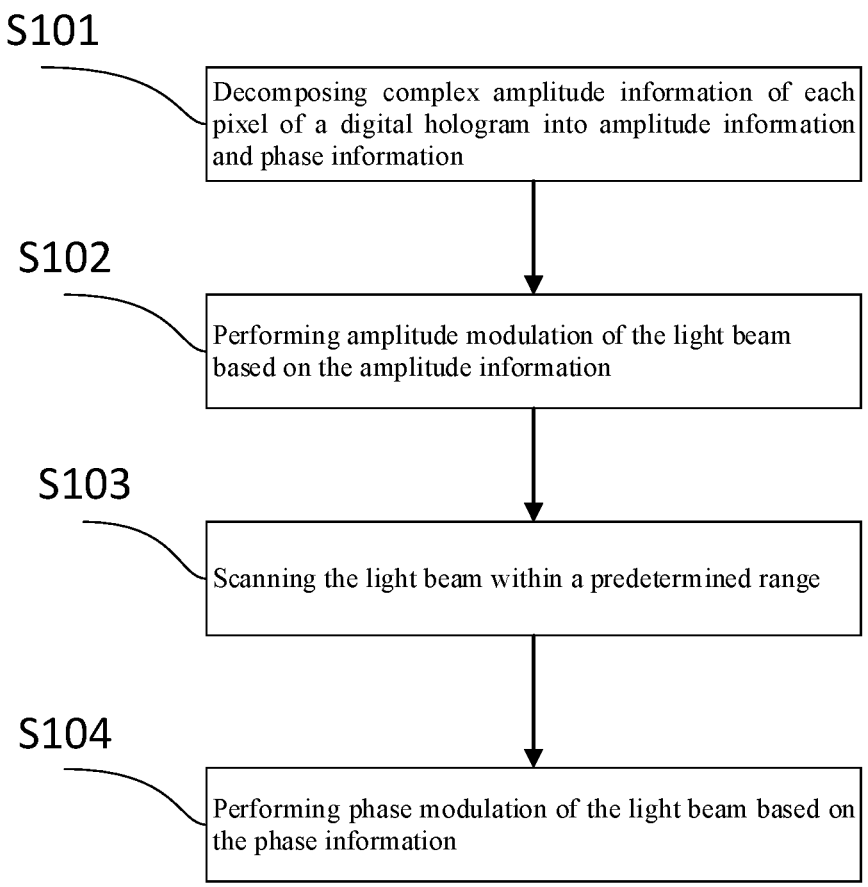
FIG. 5 is a schematic flow chart of one or more embodiments of the optical modulation method of the present disclosure.

FIG. 5 is a schematic flow chart of one or more embodiments of the optical modulation method of the present disclosure.

As shown in FIG. 5, the optical modulation method according to an embodiment of the present disclosure at least comprises:

S101. decomposing complex amplitude information of each pixel of a digital hologram into amplitude information and phase information.

Specifically, for the digital hologram to be displayed, the complex amplitude information of each pixel position in the holographic image data matrix is decomposed into amplitude information and phase information.

S102. performing amplitude modulation of the light beam based on the amplitude information.

Specifically, amplitude modulation is performed over the light beam based on the amplitude information decomposed in S101. The modulated light beam having the amplitude information of the pixel is generated in real time according to the amplitude information of each pixel in the digital hologram.

S103. scanning the light beam within a predetermined range.

In the embodiments of the present disclosure, specifically, the light beam is controlled to deflect at different angles so that the light beam is scanned within a predetermined range. As the angle at which the light beam deflects corresponds to the position of the pixel whose amplitude and phase information is represented by the light beam in the holographic image data matrix, a predetermined range within which the light beam is scanned is the same as a display range of the holographic image to be displayed.

S104. performing phase modulation of the light beam based on the phase information.

Based on the phase information decomposed in S101, phase modulation is performed over the light beam to generate the modulated light beam.

After the above steps, the light beam subject to the amplitude modulation, the optical scanning and the phase modulation are displayed as a holographic image.

In the embodiments of the present disclosure, amplitude modulation is performed over the light beam based on the amplitude information in the complex amplitude information of each pixel so that the light beam is scanned in space according to the position of each pixel in the data matrix, and at the same time, phase modulation is performed over the light beam based on the phase information in the complex amplitude information of the corresponding pixel, so that there is basically no loss in the resolution of the modulator, and high-resolution holographic display can be realized. Moreover, the modulation process requires only a small amount of computing resources, greatly reducing the difficulty of real-time processing by the computer.

In one embodiment of the present disclosure, one of performing amplitude modulation of the light beam based on the amplitude information in S102 and performing phase modulation of the light beam based on the phase information in S104 may include generating the first light beam.

In the embodiments of the present invention, since the amplitude modulation is performed independently, there is no need to embed the phase information, thus ensuring high resolution of the amplitude modulation.

In one embodiment of the present disclosure, scanning the light beam within a predetermined range in S103 may include scanning the light beam corresponding to each pixel according to the position of each pixel in the digital hologram, so that the light beam corresponding to the pixel is output to a space position corresponding to the pixel.

As discussed above, the performing order of S102, S103, and S104 according to the embodiments of the present disclosure is not limited to the above sequence, and may be changed arbitrarily. Those skilled in the art may understand that all the performing sequences of S102, S103 and S104 are included in the scope of the embodiments of the present disclosure.

In one embodiment of the present disclosure, the width of the light beam may be greater than the pixel size of the phase modulator, thereby enhancing the effectiveness of the phase modulation performed by the phase modulator over the light beam.

In one embodiment of the present disclosure, the width of the light beam may be set according to a desired resolution of the digital hologram. When a lower resolution is desired, the light beam may have a larger width; when a higher resolution is desired, the light beam may have a smaller width.

In one embodiment of the present disclosure, the polarization direction of the light beam may be set to coincide with the polarization modulation direction of the phase modulator, so that the polarization state of the light beam conforms to the polarization operating state of the phase modulator, so as to ensure the effectiveness of the phase modulation.

Exemplary descriptions have been made to various embodiments of the present disclosure above. However, those skilled in the art should understand that, the present disclosure is not limited to the aforementioned specific embodiments, and multiple modifications and amendments may be made to the aforementioned embodiments on the premise of not departing from the spirit of the present disclosure, and such modifications and amendments all fall within the scope sought to be protected in the present disclosure.

What is claimed is:

1. An optical modulation device, configured to perform optical modulation of a light beam and comprising:
    an amplitude modulator, including a light source for generating the light beam and configured to perform amplitude modulation of the light beam based on amplitude information in complex amplitude information of each pixel of a digital hologram;
    an optical scanning assembly, configured to receive the light beam after amplitude modulation from the amplitude modulator and scan the light beam within a predetermined range, wherein the optical scanning assembly includes a micromirror and a lens assembly, the micromirror is configured to rotate a corresponding deflection angle according to a position of each respective pixel in the digital hologram, and to reflect the light beam, and the lens assembly is configured to output the light beam from the micromirror along a direction parallel to an optical axis of the lens assembly;

a phase modulator, configured to receive the light beam from the optical scanning assembly and perform phase modulation of the light beam based on phase information in the complex amplitude information.

2. The optical modulation device according to claim 1, wherein the light beam is incident at a center of a deflection axis of the micromirror, and a focal point of the lens assembly is positioned at the center of a deflection axis of the micromirror.

3. The optical modulation device according to claim 1, wherein the optical modulation device further comprises:

a light splitter, configured to be arranged on an output light path of the optical scanning assembly and positioned to transmit the light beam to the phase modulator and to reflect the phase modulated light beam from the phase modulator.

4. The optical modulation device according to claim 1, wherein the optical modulation device further comprises:

a reflector, configured to be arranged on an output light path of the optical scanning assembly and positioned to reflect the phase modulated light beam from the phase modulator.

5. The optical modulation device according to claim 1, wherein a width of the light beam is larger than a pixel size of the phase modulator.

6. The optical modulation device according to claim 1, wherein a width of the light beam is set according to a desired resolution of the digital hologram.

7. The optical modulation device according to claim 1, wherein a polarization direction of the light beam is set to coincide with a polarization modulation direction of the phase modulator.

8. A holographic display apparatus, comprising:

an optical modulation device, configured to perform optical modulation of a light beam and comprising:

an amplitude modulator, including a light source for generating the light beam and configured to perform amplitude modulation of the light beam based on amplitude information in complex amplitude information of each pixel of a digital hologram;

an optical scanning assembly, configured to receive the light beam after amplitude modulation from the amplitude modulator and scan the light beam within a predetermined range, wherein the optical scanning assembly includes a micromirror and a lens assembly, the micromirror is configured to rotate a corresponding deflection angle according to a position of each respective pixel in the digital hologram, and to reflect the light beam, and the lens assembly is configured to output the light beam from the micromirror along a direction parallel to an optical axis of the lens assembly;

a phase modulator, configured to receive the light beam from the optical scanning assembly and perform phase modulation of the light beam based on phase information in the complex amplitude information; and a controller, configured to receive a digital hologram to be displayed and decompose complex amplitude information of each pixel of the digital hologram into the amplitude information and the phase information to generate an amplitude modulation control signal and a phase modulation control signal, and respectively send the amplitude modulation control signal and the phase modulation control signal to the amplitude modulator and the phase modulator.

9. An optical modulation method, which is used for performing optical modulation of a light beam and comprising:

decomposing complex amplitude information of each pixel of a digital hologram into amplitude information and phase information;

generating the light beam;

performing amplitude modulation of the light beam based on the amplitude information;

scanning the light beam after amplitude modulation within a predetermined range;

performing phase modulation of the scanned light beam based on the phase information, wherein scanning the light beam after amplitude modulation within a predetermined range comprises: receiving, by a micromirror configured to rotate a corresponding deflection angle according to a position of each respective pixel in the digital hologram, the light beam after amplitude modulation and reflecting the light beam, and outputting, by a lens assembly, the reflected light beam along a direction parallel to an optical axis of the lens assembly.

10. The optical modulation method according to claim 9, wherein a width of the light beam is larger than a pixel size of a phase modulator for performing the phase modulation.

11. The optical modulation method according to claim 9, wherein a width of the light beam is set according to a desired resolution of the digital hologram.

12. The optical modulation method according to claim 9, wherein a polarization direction of the light beam is set to coincide with a polarization modulation direction of a phase modulator for performing phase modulation.

* * * * *